United States Patent
Ying (10) Patent No.: US 10,205,992 B2
(45) Date of Patent: Feb. 12, 2019

(54) VIDEO DECODING METHOD, SERVER, AND MOBILE TERMINAL

(71) Applicant: TENCENT TECHNOLOGY (SHENZHEN) COMPANY LIMITED, Shenzhen (CN)

(72) Inventor: Yulong Ying, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/728,280

(22) Filed: Oct. 9, 2017

(65) Prior Publication Data

US 2018/0035160 A1   Feb. 1, 2018

Related U.S. Application Data (63) Continuation of application No. PCT/CN2016/082201, filed on May 16, 2016.

(30) Foreign Application Priority Data

Sep. 28, 2015  (CN) .......................... 2015 1 0628525

(51) Int. Cl.
H04N 21/4402 (2011.01)
H04N 21/414 (2011.01)
(Continued)

(52) U.S. Cl.
CPC ......... *H04N 21/4402* (2013.01); *H04N 19/44* (2014.11); *H04N 21/25833* (2013.01);
(Continued)

(58) Field of Classification Search
None
See application file for complete search history.

(56) References Cited

U.S. PATENT DOCUMENTS 8,131,875 B1 * 3/2012 Chen ................ H04M 1/72522
707/E17.121
2003/0185306 A1 10/2003 MacInnis et al.
(Continued)

FOREIGN PATENT DOCUMENTS

CN 101986708 A 3/2011
CN 102802138 A 11/2012
(Continued)

OTHER PUBLICATIONS

The World Intellectual Property Organization (WIPO) International Search Report for PCT/CN2016/082201 dated Jun. 29, 2016 6 Pages (including translation).

*Primary Examiner* — Michael R Telan
(74) *Attorney, Agent, or Firm* — Anova Law Group, PLLC (57) ABSTRACT

This application discloses a video decoding method for a mobile terminal. The method includes receiving a video file from a server; based on a hardware-decoding model whitelist and a hardware-decoding operating-system blacklist, obtained from a server, and locally obtained type information of the mobile terminal, determining whether a decoding method of the video file is hardware decoding or software decoding; and decoding the video file by using the determined decoding method and playing back the decoded video file, wherein the hardware-decoding model whitelist includes model information of mobile terminals that can perform hardware decoding on the video file, and the hardware-decoding operating-system blacklist includes model information of mobile terminals that do not support hardware decoding on the video file and version numbers of operating systems of the mobile terminals.

18 Claims, 7 Drawing Sheets

(51) Int. Cl.
  *H04N 21/442*  (2011.01)
  *H04N 21/858*  (2011.01)
  *H04N 21/258*  (2011.01)
  *H04N 21/44*  (2011.01)
  *H04N 21/654*  (2011.01)
  *H04N 19/44*  (2014.01)
  *H04N 21/422*  (2011.01)
  *H04N 21/4425*  (2011.01)

(52) U.S. Cl.
  CPC . *H04N 21/41407* (2013.01); *H04N 21/42206* (2013.01); *H04N 21/4425* (2013.01); *H04N 21/654* (2013.01); *H04N 21/8586* (2013.01)

(56) References Cited

U.S. PATENT DOCUMENTS

| | | | | |
|---|---|---|---|---|
| 2008/0021993 | A1* | 1/2008 | Compton | H04L 41/0853 709/224 |
| 2008/0137548 | A1* | 6/2008 | Hassan | H04W 28/18 370/252 |
| 2013/0034146 | A1* | 2/2013 | Jeong | H04N 7/147 375/240.01 |

FOREIGN PATENT DOCUMENTS

| | | |
|---|---|---|
| CN | 102984587 A | 3/2013 |
| CN | 103179431 A | 6/2016 |

* cited by examiner

VIDEO DECODING METHOD, SERVER, AND MOBILE TERMINAL

RELATED APPLICATIONS

This application is a continuation application of PCT Patent Application No. PCT/CN2016/082201, filed on May 16, 2016, which claims priority to Chinese Patent Application No. 201510628525.4, entitled "VIDEO DECODING METHOD, SERVER, AND MOBILE TERMINAL" filed with the Chinese Patent Office on Sep. 28, 2015, which is incorporated herein by reference in its entirety.

FIELD OF THE TECHNOLOGY

The present disclosure relates to the field of video processing technologies and, in particular, to a video decoding method, a server, and a mobile terminal.

BACKGROUND OF THE DISCLOSURE

Currently, when receiving a video file from an online video streaming service, a mobile terminal may decode the video file by using a software decoding method or a hardware decoding method, and then play the decoded video file. In the software decoding method, a software decoder uses a central processing unit (CPU) to invoke a software program to decode the video stream in the video file. In the hardware decoding method, a hardware decoder uses a graphics processing unit (GPU) to decode the video stream in the video file.

SUMMARY

Embodiments of the present disclosure provide a video decoding method, a server, and a mobile terminal, to select a video decoding format, reducing a possibility of operating system crashidisng caused by the hardware decoding.

An embodiment of the present disclosure provides a video decoding method for a mobile terminal. The method includes: receiving a video file from a server; based on a hardware-decoding model whitelist and a hardware-decoding operating-system blacklist, obtained from a server, and locally obtained type information of the mobile terminal, determining whether a decoding method of the video file is hardware decoding or software decoding; and decoding the video file by using the determined decoding method and playing back the decoded video file, wherein the hardware-decoding model whitelist includes model information of mobile terminals that can perform hardware decoding on the video file, and the hardware-decoding operating-system blacklist includes model information of mobile terminals that do not support hardware decoding on the video file and version numbers of operating systems of the mobile terminals.

The present disclosure provides a mobile terminal. The mobile terminal includes a memory storing instructions; and a processor coupled to the memory. When executing the instructions, the processor is configured for: receiving a video file from a server; based on a hardware-decoding model whitelist and a hardware-decoding operating-system blacklist, obtained from a server, and locally obtained type information of the mobile terminal, determining whether a decoding method of the video file is hardware decoding or software decoding; and decoding the video file by using the determined decoding method and playing back the decoded video file, wherein the hardware-decoding model whitelist includes model information of mobile terminals that can perform hardware decoding on the video file, and the hardware-decoding operating-system blacklist includes model information of mobile terminals that do not support hardware decoding on the video file and version numbers of operating systems of the mobile terminals.

Another aspect of the present disclosure provides a non-transitory computer-readable medium containing computer-executable program for, when being executed by a processor, implementing a video decoding method for a mobile terminal. The method includes: receiving a video file from a server; based on a hardware-decoding model whitelist and a hardware-decoding operating-system blacklist, obtained from a server, and locally obtained type information of the mobile terminal, determining whether a decoding method of the video file is hardware decoding or software decoding; and decoding the video file by using the determined decoding method and playing back the decoded video file, wherein the hardware-decoding model whitelist includes model information of mobile terminals that can perform hardware decoding on the video file, and the hardware-decoding operating-system blacklist includes model information of mobile terminals that do not support hardware decoding on the video file and version numbers of operating systems of the mobile terminals.

BRIEF DESCRIPTION OF THE DRAWINGS

To describe the technical solutions of the embodiments of the present disclosure or the existing technology more clearly, the following briefly introduces the accompanying drawings for describing the embodiments. Apparently, the accompanying drawings in the following description show only some embodiments of the present disclosure, and a person of ordinary skill in the art may derive other drawings from these accompanying drawings without creative efforts.

DESCRIPTION OF EMBODIMENTS

The following describes the technical solutions in the embodiments of the present disclosure with reference to the accompanying drawingspresent disclosure. Apparently, the described embodiments are some of the embodiments of the present disclosure rather than all of the embodiments. All other embodiments obtained by a person of ordinary skill in the art based on the disclosed embodiments of the present disclosure without creative efforts shall fall within the protection scope of the present disclosure.

According to the present disclosure, although video files in various video formats may be decoded by a mobile terminal using a software decoding method, the software decoding method requires a central processing unit (CPU) to invoke a software program to implement the video file decoding, occupying too many system processing resources. In addition, power consumption of the mobile terminal is increased, causing the body of the mobile terminal to be burning hot. In a hardware decoding method, a dedicated video processing chip GPU is invoked, and therefore power consumption of the mobile terminal is not increased, and not too many system resources need to be occupied. However, some types of mobile terminals do not support the hardware decoding method, and therefore do not support decoding the video file by using the hardware decoding method. Otherwise, operating systems of the mobile terminals consequently crash.

In view of this, an embodiment of the present disclosure provides a video decoding method. The method is applied to a mobile terminal receiving a video file from an online video streaming service. According to the method provided in this embodiment of the present disclosure, when a video file of an online video streaming service is received, according to a hardware-decoding mobile-terminal list obtained from a server, locally obtained type information of the mobile terminal, and identifier information of the video file, it is determined whether the decoding method for the video file is hardware decoding or software decoding. The hardware-decoding mobile-terminal list includes type information of mobile terminals that can perform hardware decoding on the video file. The video file is decoded by using the determined decoding method and played. Therefore, a video decoding selection manner is provided, reducing a possibility of operating system crashing caused by hardware decoding.

Figure 1:
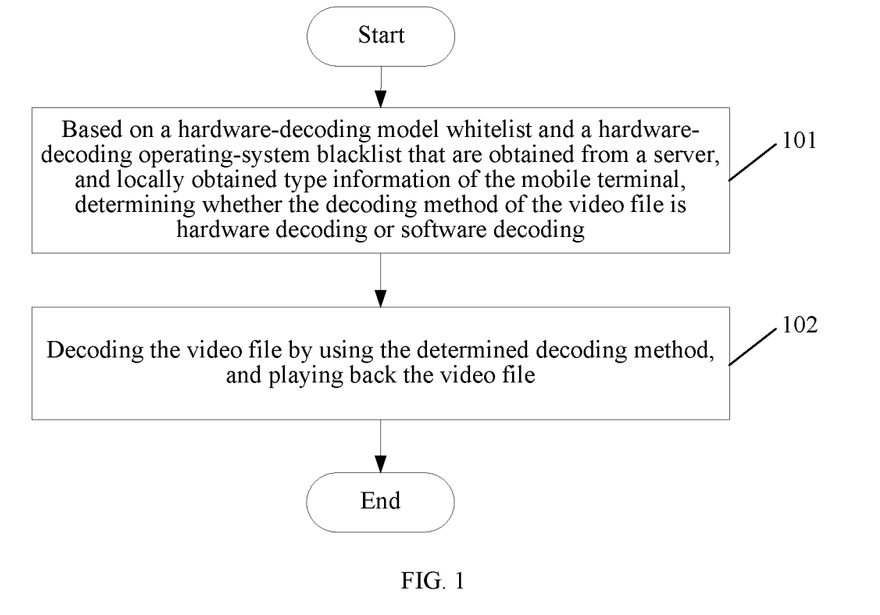
FIG. 1 is a flowchart of a video decoding method according to an embodiment of the present disclosure.

FIG. 1 is a flowchart of a video decoding method according to an embodiment of the present disclosure. The method is applied to a mobile terminal that receives a video file of an online video streaming service. As shown in FIG. 1, when the video file of an online video streaming service is received, the method further includes the followings.

Step 101: Based on a hardware-decoding model whitelist and a hardware-decoding operating-system blacklist that are obtained from a server, and locally obtained type information of the mobile terminal, determining whether the decoding method of the video file is hardware decoding or software decoding.

In an embodiment of the present disclosure, the hardware-decoding model whitelist includes model information of mobile terminals that can perform hardware decoding on the video file, and the hardware-decoding operating-system blacklist includes model information of mobile terminals that do not support hardware decoding on the video file and version numbers of the operating systems of the mobile terminals.

In an embodiment of the present disclosure, type information of the mobile terminals includes the model information of the mobile terminals and the version number of the operating system of the mobile terminals.

The mobile terminal determines whether the hardware-decoding model whitelist includes the model information of the mobile terminal. After determining that the hardware-decoding model whitelist includes the model information of the mobile terminal, the terminal device further determines whether the hardware-decoding operating-system blacklist includes the model of the mobile terminal and the version number of the operating system of the mobile terminal. If the mobile terminal determines that the hardware-decoding operating-system blacklist does not include the model information of the mobile terminal and the version number of the operating system of the mobile terminal, the terminal device determines that the decoding method is the hardware decoding.

For example, the hardware-decoding model whitelist includes Millet 2 and Millet 3. The hardware-decoding operating-system blacklist includes (Millet 2, operating system version A1), (Millet 3, operating system version A1). The model of the mobile terminal is Millet 2, and an operating system version is A2. After receiving a video file, the mobile terminal determines that the hardware-decoding model whitelist includes the model of the mobile terminal (Millet 2). Then, the mobile terminal determines that the hardware-decoding operating-system blacklist does not include both the model of the mobile terminal (Millet 2) and the operating system version number (A2). Therefore, the mobile terminal determines that the decoding method is the hardware decoding.

In an embodiment of the present disclosure, the type information of the mobile terminal includes the model information of the mobile terminal and the version number of the operating system of the mobile terminal.

The mobile terminal determines whether the hardware-decoding model whitelist includes the model information of the mobile terminal. If determining that the hardware-decoding model whitelist includes the model information of the mobile terminal, the mobile terminal further determines whether the hardware-decoding operating-system blacklist includes a model of the mobile terminal and the version number of the operating system of the mobile terminal. If determining that the hardware-decoding operating-system blacklist does not include the model of the mobile terminal and the version number of the operating system of the mobile terminal, the mobile terminal determines whether a hardware-decoding-crash video information list includes the URL (universal resource locator) of the video file. If determining that the hardware-decoding-crash video information list does not include the URL of the video file, the mobile terminal determines that the decoding method is the hardware decoding.

If determining that the hardware-decoding model whitelist does not include the model information of the mobile terminal, the mobile terminal determines that the decoding method is the software decoding. If determining that the hardware-decoding operating-system blacklist includes the model information of the mobile terminal and the version number of the operating system of the mobile terminal, the mobile terminal determines that the decoding method is the software decoding. If determining that the hardware-decoding-crash video information list includes the URL of the video file, the mobile terminal determines that the decoding method for decoding the video file is the software decoding.

Step 102: Decoding the video file by using the determined decoding method, and playing back the video file.

Figure 2:
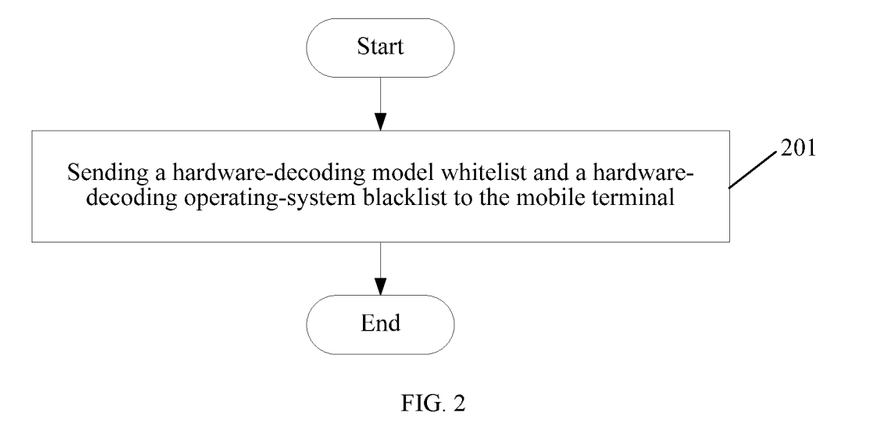
FIG. 2 is a flowchart of a video decoding method according to an embodiment of the present disclosure.

FIG. 2 is a flowchart of a video decoding method according to an embodiment of the present disclosure. The method is applied to a server that provides video files of an online video streaming service. As shown in FIG. 2, when the server provides a mobile terminal with a video file of the online video streaming service, the method includes the followings.

Step 201: Sending a hardware-decoding model whitelist and a hardware-decoding operating-system blacklist to the mobile terminal.

In this way, the mobile terminal can determine whether a decoding method of the video file is hardware decoding or software decoding according to the hardware-decoding model whitelist, the hardware-decoding operating-system blacklist, and type information of the mobile terminal. The hardware-decoding model whitelist includes model information of mobile terminals that can perform hardware decoding on the video file, and the hardware-decoding operating-system blacklist includes model information of mobile terminals that do not support hardware decoding on the video file and version numbers of operating systems of the mobile terminals.

Figure 3:
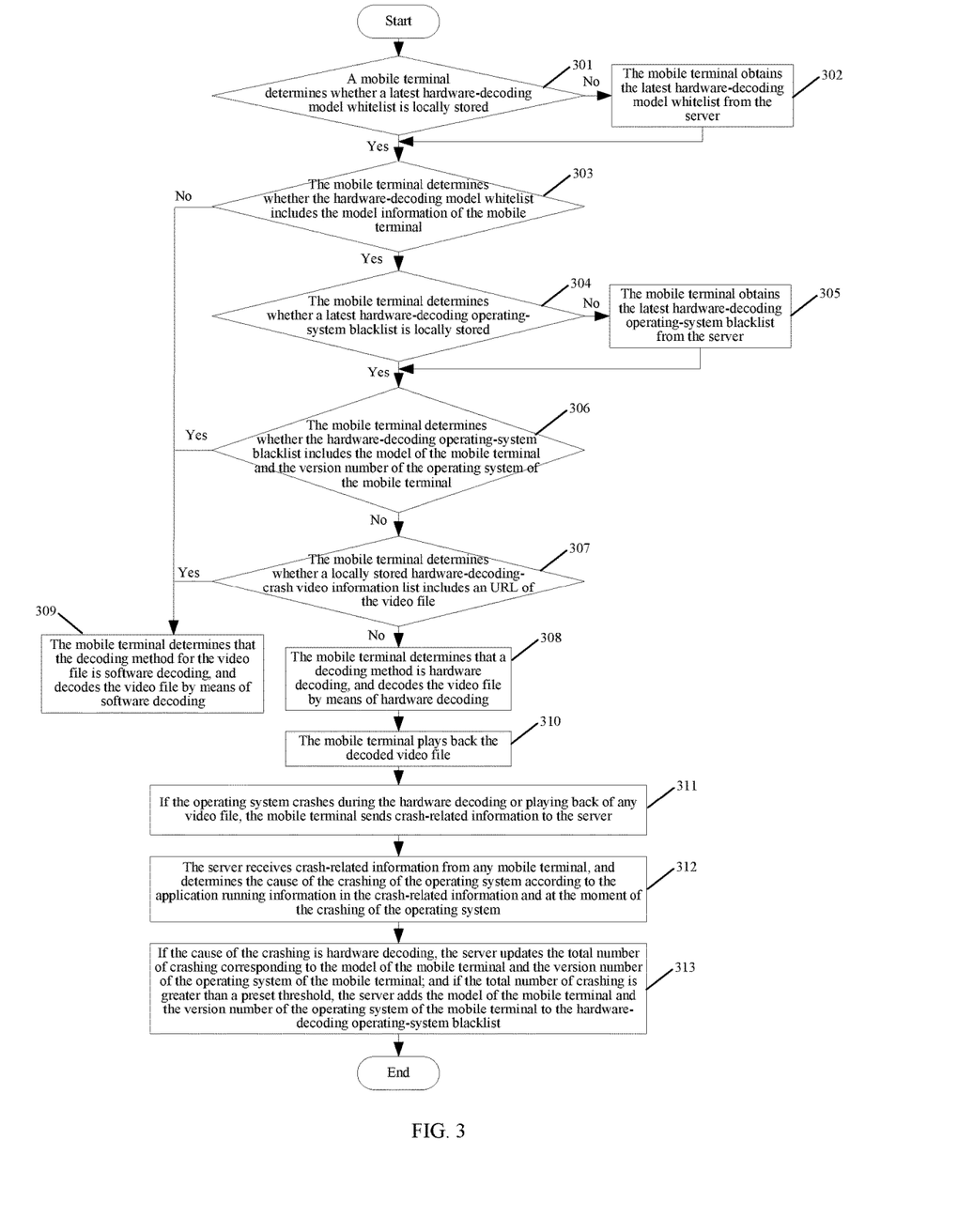
FIG. 3 is a flowchart of a video decoding method according to an embodiment of the present disclosure.

FIG. 3 is a flowchart of a video decoding method according to an embodiment of the present disclosure. As shown in FIG. 3, the method includes the followings.

Step 301: A mobile terminal determines whether a latest hardware-decoding model whitelist is locally stored.

In an embodiment of the present disclosure, the hardware-decoding model whitelist includes model information of mobile terminals that can perform hardware decoding on the video file.

In an embodiment of the present disclosure, the mobile terminal may determine, only when playing an online video file for the first time, whether the latest hardware-decoding model whitelist is locally stored. For example, when playing an online video file for the first time by using a video play application, the mobile terminal determines whether the latest hardware-decoding model whitelist is locally stored. Alternatively, when playing an online video file for the first time by using a web browser, the mobile terminal determines whether the latest hardware-decoding model whitelist is locally stored. In another embodiment of the present disclosure, the mobile terminal may determine, each time when playing an online video file, whether the latest hardware-decoding model whitelist is locally stored.

If it is determined that the latest hardware-decoding model whitelist is not locally stored, step 302 is performed. Otherwise, step 303 is performed.

Step 302: The mobile terminal obtains the latest hardware-decoding model whitelist from the server.

In an embodiment of the present disclosure, the mobile terminal sends a request for obtaining the latest hardware-decoding model whitelist to the server, and receives the latest hardware-decoding model whitelist from the server.

Step 303: The mobile terminal determines whether the hardware-decoding model whitelist includes the model information of the mobile terminal.

If it is determined that the hardware-decoding model whitelist does not include the model information of the mobile terminal, step 309 is performed. If it is determined that the hardware-decoding model whitelist includes the model information of the mobile terminal, step 304 is performed.

Step 304: The mobile terminal determines whether a latest hardware-decoding operating-system blacklist is locally stored.

The hardware-decoding operating-system blacklist includes model information of mobile terminals that do not support hardware decoding on the video file and version numbers of operating systems of the mobile terminals.

If it is determined that the latest hardware-decoding operating-system blacklist is not locally stored in the mobile terminal, step 305 is performed. Otherwise, step 306 is performed.

Step 305: The mobile terminal obtains the latest hardware-decoding operating-system blacklist from the server.

Step 306: The mobile terminal determines whether the hardware-decoding operating-system blacklist includes the model of the mobile terminal and the version number of the operating system of the mobile terminal.

If it is determined that the hardware-decoding operating-system blacklist includes the model of the mobile terminal and the version number of the operating system of the mobile terminal, step 309 is performed. If it is determined that the hardware-decoding operating-system blacklist does not include the model of the mobile terminal or the version number of the operating system of the mobile terminal, step 307 is performed.

Step 307: The mobile terminal determines whether a locally stored hardware-decoding-crash video information list includes an URL of the video file.

In an embodiment of the present disclosure, the locally stored hardware-decoding-crash video information list includes information about a preset number of video files, and any video file included in the list is a latest video file that causes the operating system to crash when decoding is performed by means of hardware decoding.

If it is determined that the hardware-decoding-crash video information list includes the URL of the video file, step 309 is performed. If it is determined that the hardware-decoding-crash video information list does not include the URL of the video file, step 308 is performed.

Step 308: The mobile terminal determines that a decoding method is hardware decoding, and decodes the video file by means of hardware decoding. After completing the hardware decoding, the mobile terminal performs step 310.

Step 309: The mobile terminal determines that the decoding method for the video file is software decoding, and decodes the video file by means of software decoding.

Step 310: The mobile terminal plays back the decoded video file.

In an embodiment of the present disclosure, when step 310 is performed, the method may further include the following steps, so that the server updates the hardware-decoding operating-system blacklist.

Step 311: If the operating system crashes during the hardware decoding or playing back of any video file, the mobile terminal sends crash-related information to the server. The crash-related information includes the model information of the mobile terminal, the version number of the operating system, and application running information that is at a moment of the crashing of the operating system.

Step 312: The server receives crash-related information from any mobile terminal, and determines the cause of the crashing of the operating system according to the application running information in the crash-related information and at the moment of the crashing of the operating system.

In an embodiment of the present disclosure, the application running information includes program stack information, video play progress information, and the like, corresponding to the application at the moment of the crashing.

Step 313: If the cause of the crashing is hardware decoding, the server updates the total number of crashing corresponding to the model of the mobile terminal and the version number of the operating system of the mobile terminal; and if the total number of crashing is greater than a preset threshold, the server adds the model of the mobile terminal and the version number of the operating system of the mobile terminal to the hardware-decoding operating-system blacklist.

In an embodiment of the present disclosure, the server may perform a video hardware decoding test on mobile terminals of different models, to generate a hardware-decoding model whitelist.

Figure 4:
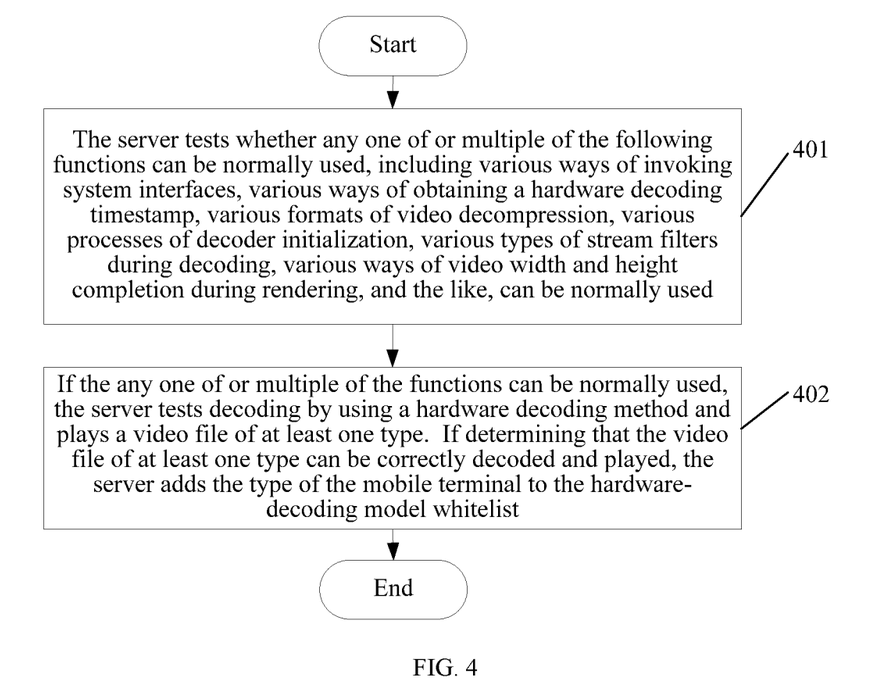
FIG. 4 is a flowchart of a hardware-decoding model whitelist generation method according to an embodiment of the present disclosure.

In an embodiment of the present disclosure, as shown in FIG. 4, for a mobile terminal of a preset model, a server may generate a hardware-decoding model whitelist in the following manner.

Step 401: The server tests whether any one of or multiple of the following functions can be normally used, including various ways of invoking system interfaces, various ways of obtaining a hardware decoding timestamp, various formats of video decompression, various processes of decoder initialization, various types of stream filters during decoding, various ways of video width and height completion during rendering, and the like, can be normally used.

Step 402: If the any one of or multiple of the functions can be normally used, the server tests decoding by using a hardware decoding method and plays a video file of at least one type. If determining that the video file of at least one type can be correctly decoded and played, the server adds the type of the mobile terminal to the hardware-decoding model whitelist.

Figure 5:
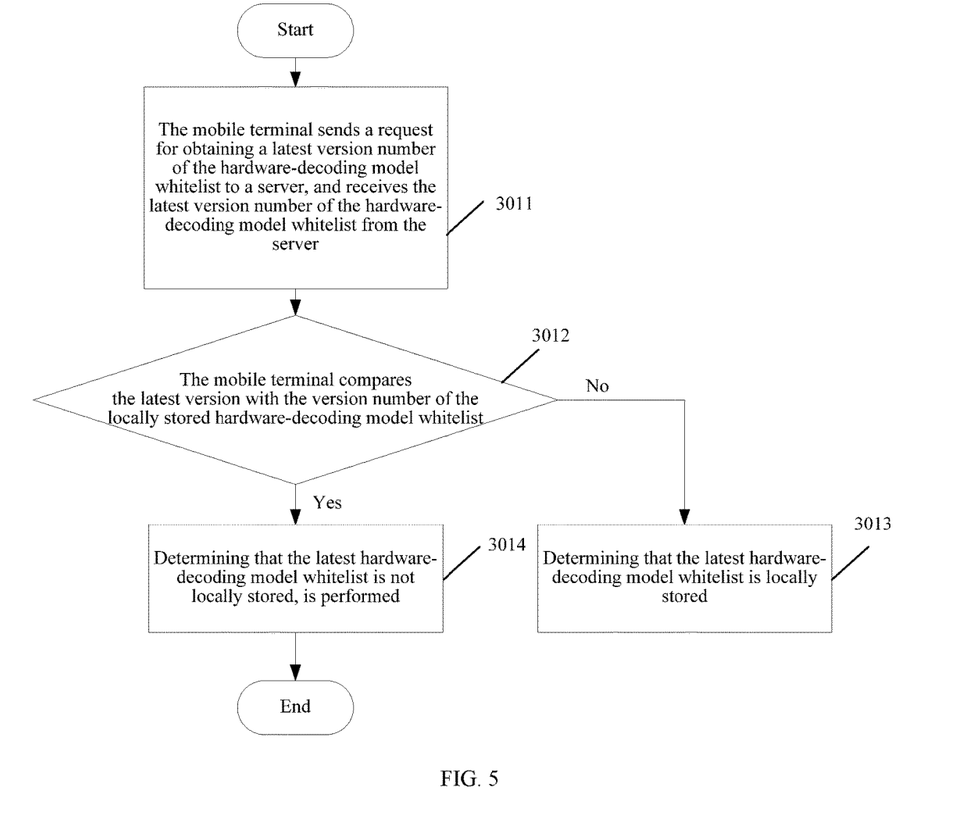
FIG. 5 is a flowchart of a method for determining whether a latest hardware-decoding model whitelist is locally stored according to an embodiment of the present disclosure.

In an embodiment of the present disclosure, as shown in FIG. 5, step 301 may include the following steps:

Step 3011: The mobile terminal sends a request for obtaining a latest version number of the hardware-decoding model whitelist to a server, and receives the latest version number of the hardware-decoding model whitelist from the server.

Step 3012: The mobile terminal compares the latest version with the version number of the locally stored hardware-decoding model whitelist.

If the latest version number and the locally stored version number are different, step 3013, determining that the latest hardware-decoding model whitelist is not locally stored, is performed. Otherwise, step 3014, determining that the latest hardware-decoding model whitelist is locally stored, is performed.

Figure 6:
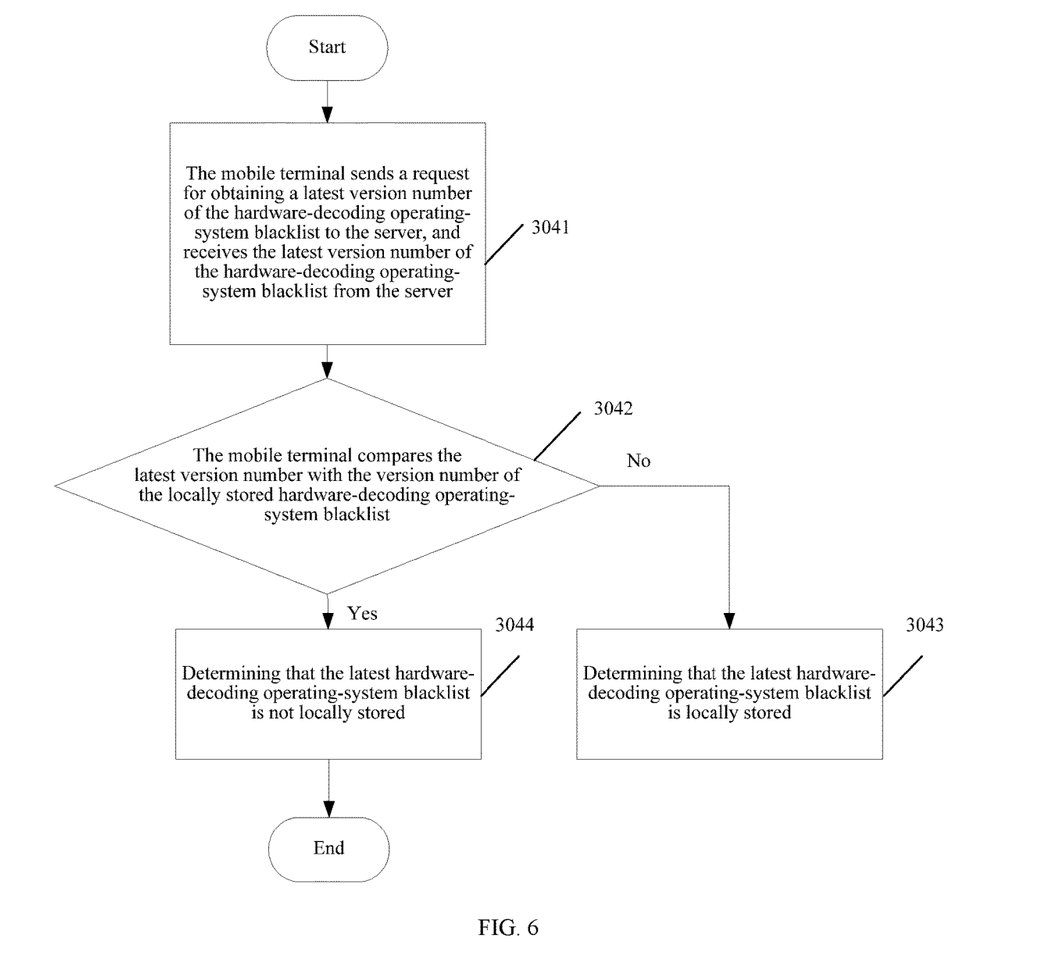
FIG. 6 is a flowchart of a method for determining whether a latest hardware-decoding operating-system blacklist is locally stored according to an embodiment of the present disclosure.

In an embodiment of the present disclosure, as shown in FIG. 6, step 304 may include the followings.

Step 3041: The mobile terminal sends a request for obtaining a latest version number of the hardware-decoding operating-system blacklist to the server, and receives the latest version number of the hardware-decoding operating-system blacklist from the server.

Step 3042: The mobile terminal compares the latest version number with the version number of the locally stored hardware-decoding operating-system blacklist.

If the latest version number and the locally stored version number are different, step 3034, determining that the latest hardware-decoding operating-system blacklist is not locally stored, is performed. Otherwise, step 3044, determining that the latest hardware-decoding operating-system blacklist is locally stored, is performed.

The above descriptions disclose the video decoding method according to the embodiments of the present disclosure. The following describes, with reference to the accompanying drawings, a mobile terminal, a server, and a system that are provided according to embodiments of the present disclosure.

Figure 7:
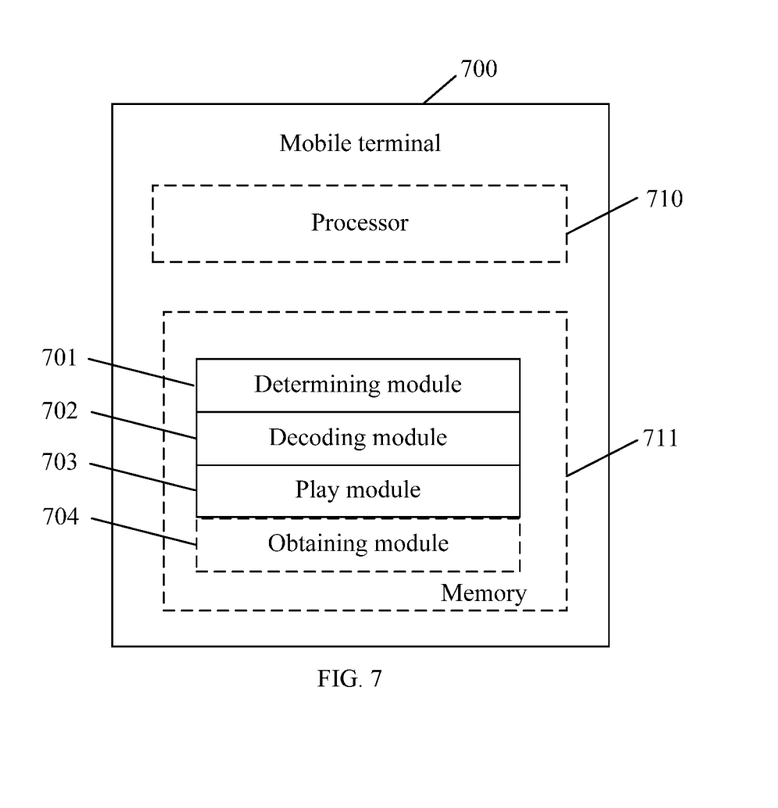
FIG. 7 is a schematic structural diagram of a mobile terminal according to an embodiment of the present disclosure.

FIG. 7 is a schematic structural diagram of a mobile terminal according to an embodiment of the present disclosure. The mobile terminal refers to a terminal device having data calculation and processing functions, including, but is not limited to, a smartphone, a palmtop computer, a tablet computer, a smart TV (Smart TV), or the like (installed with a communications module). Operating systems are installed in all these communications terminals, and include, but are not limited to, the Android operating system, the Symbian operating system, the Windows mobile operating system, the Apple iPhone OS operating system, and the like.

As shown in FIG. 7, the mobile terminal 700 includes a determining module 701, a decoding module 702, and play module 703.

The determining module 701 is configured to, based on a hardware-decoding model whitelist and a hardware-decoding operating-system blacklist that are obtained from a server, and locally obtained type information of the mobile terminal, determining whether the decoding method of the video file is hardware decoding or software decoding. The hardware-decoding model whitelist includes model information of mobile terminals that can perform hardware decoding on the video file, and the hardware-decoding operating-system blacklist includes model information of mobile terminals that do not support hardware decoding on the video file and version numbers of the operating systems of the mobile terminals.

The decoding module 702 is configured to decode the video file by using the determined decoding method. The play module 703 is configured to play the decoded video file.

In an embodiment of the present disclosure, the mobile terminal further includes an obtaining module 704, which is configured to: before the determining whether a decoding method of the video file is hardware decoding or software decoding, obtain a latest version of the hardware-decoding model whitelist and/or a latest version of the hardware-decoding operating-system blacklist from a server; if the latest version of the hardware-decoding model whitelist has been obtained from the server, compare the latest version of the hardware-decoding model whitelist with a version of the locally stored hardware-decoding model whitelist; and if they are different, obtain the latest hardware-decoding model whitelist from the server; or if the latest version of the hardware-decoding operating-system blacklist is obtained from the server, compare the latest version of the hardware-decoding operating-system blacklist with a version of the locally stored hardware-decoding operating-system blacklist; and if they are different, obtain the latest hardware-decoding operating-system blacklist from the server.

In an embodiment of the present disclosure, type information of the mobile terminal includes the model information of the mobile terminal and the version of the operating system of the mobile terminal. The determining module 701 is configured to: determine whether the hardware-decoding model whitelist includes the model information of the mobile terminal; if determining that the hardware-decoding model whitelist includes the model information of the mobile terminal, determine whether the hardware-decoding operating-system blacklist includes the model of the mobile terminal and the version of the operating system of the mobile terminal; and if determining that the hardware-decoding operating-system blacklist does not include the model information of the mobile terminal or the version of the operating system of the mobile terminal, determine that the decoding method is the hardware decoding.

In an embodiment of the present disclosure, type information of the mobile terminal includes the model information of the mobile terminal and the version number of the operating system of the mobile terminalpresent disclosure. The determining module 701 is configured to: determine whether the hardware-decoding model whitelist includes the model information of the mobile terminal; if determining that the hardware-decoding model whitelist includes the model information of the mobile terminal, determine whether the hardware-decoding operating-system blacklist includes a model of the mobile terminal and the version number of the operating system of the mobile terminal; if determining that the hardware-decoding operating-system blacklist does not include the model information of the mobile terminal and the version number of the operating system of the mobile terminal, determine whether a hardware-decoding-crash video information list includes a URL of the video file; and if determining that the hardware-decoding-crash video information list does not include the URL of the video file, determine that the decoding method is the hardware decoding.

The modules 701 to 704 may be instruction modules that are stored in a memory 711 in the mobile terminal 700. These instruction modules include an instruction that can be executed by a processor. A processor 710 in the mobile terminal 700 may execute an instruction in the modules 701 to 704, to implement various functions of the modules 701 to 704.

Figure 8:
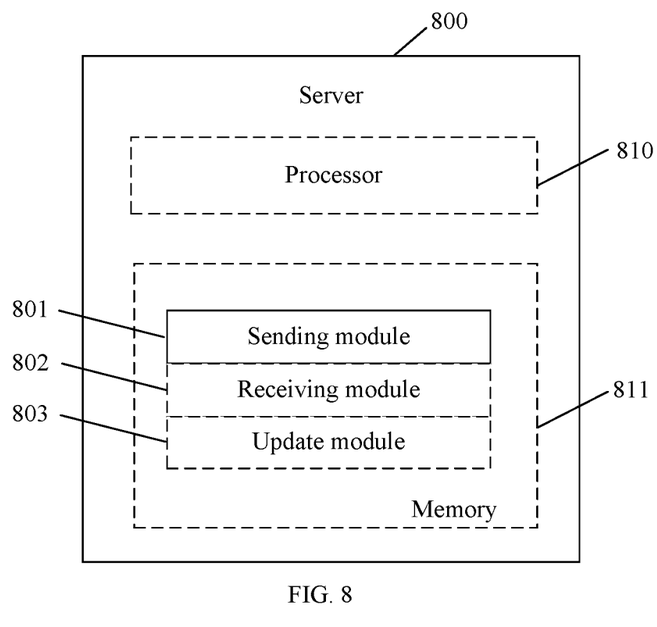
FIG. 8 is a schematic structural diagram of a server according to an embodiment of the present disclosure.

FIG. 8 is a schematic structural diagram of a server according to an embodiment of the present disclosure. As shown in FIG. 8, the server 800 includes a sending module 801. The sending module 801 is configured to send a hardware-decoding model whitelist and a hardware-decoding operating-system blacklist to the mobile terminal, so that the mobile terminal determines whether a decoding method of the video file is hardware decoding or software decoding according to the hardware-decoding model whitelist, the hardware-decoding operating-system blacklist, and type information of the mobile terminal. The hardware-decoding model whitelist including model information of mobile terminals that can perform hardware decoding on the video file, and the hardware-decoding operating-system blacklist including model information of mobile terminals that do not support hardware decoding on the video file and version numbers of operating systems of the mobile terminals.

In an embodiment of the present disclosure, the sending module 801 is further configured to: after sending a hardware-decoding mobile-terminal list to the mobile terminal, when receiving a request from the mobile terminal for obtaining the version number of the hardware-decoding model whitelist, send a latest version number of the hardware-decoding model whitelist to the mobile terminal, so that the mobile terminal determines whether a latest hardware-decoding model whitelist is locally stored; when receiving a request that is from the mobile terminal and that is for obtaining the latest hardware-decoding model whitelist, send the latest hardware-decoding model whitelist to the mobile terminal; when receiving a request that is from the mobile terminal and that is for obtaining a version number of the hardware-decoding operating-system blacklist, send a latest version of the hardware-decoding operating-system blacklist to the mobile terminal, so that the mobile terminal determines whether a latest hardware-decoding operating-system blacklist is locally stored; and when receiving a request from the mobile terminal for obtaining the latest hardware-decoding operating-system blacklist, sending the latest hardware-decoding operating-system blacklist to the mobile terminal.

In an embodiment of the present disclosure, the server further includes a receiving module 802 and an update module 803. The receiving module 802 is configured to receive crash-related information from any mobile terminal, where the crash-related information includes model information of the mobile terminal, a version number of the operating system of the mobile terminal, and application running information at the moment of crashing of the operating system.

The update module 803 is configured to determine a cause of the crashing of the operating system according to the application running information at the moment of the crashing of the operating system and in the crash-related information; if the cause of the crashing is hardware decoding, updating the total number of crashing corresponding to the model of the mobile terminal and the version number of the operating system of the mobile terminal; and if the total number of crashing is greater than a preset threshold, add the model of the mobile terminal and the version number of the operating system of the mobile terminal to the hardware-decoding operating-system blacklist.

The modules 801 to 803 may be instruction modules that are stored in a memory 811 in the server 800. These instruction modules include an instruction that can be executed by a processor. A processor 810 in the server 800 may execute an instruction in the modules 801 to 803, to implement various functions of the modules 801 to 803.

In addition, the functional modules in the embodiments of the present disclosure may be integrated into one processing unit, or each of the modules may exist alone physically, or two or more modules are integrated into one unit. The integrated unit may be implemented in a form of hardware, or may be implemented in a form of a software functional unit. The functional modules in the embodiments may be located in one terminal or network node, or may be distributed on multiple terminals or network nodes.

An embodiment of the present disclosure provides a video decoding method for a server. The method includes: sending a video file to a mobile terminal for playback; and sending a hardware-decoding model whitelist and a hardware-decoding operating-system blacklist to the mobile terminal, so as to cause the mobile terminal to, based on the hardware-decoding model whitelist and the hardware-decoding operating-system blacklist, and locally obtained type information of the mobile terminal, determine whether a decoding method of the video file is hardware decoding or software decoding, wherein the hardware-decoding model whitelist includes model information of mobile terminals that can perform hardware decoding on the video file, and the hardware-decoding operating-system blacklist includes model information of mobile terminals that do not support hardware decoding on the video file and version numbers of operating systems of the mobile terminals.

In addition, each embodiment of the present disclosure may be implemented by a data processing program that is executed by a data processing device such as a computer. Apparently, the data processing program constitutes the present disclosure. In addition, generally a data processing program stored in a storage medium is executed by directly reading the program from the storage medium or by installing or copying the program to a storage device (such as a hard disk or memory) of a data processing device. Therefore, such a storage medium also constitutes the present disclosure. The storage medium may use any type of recording, for example, a paper storage medium (such as a paper tape), a magnetic storage medium (such as a floppy disk, a hard disk, or a flash memory), an optical storage medium (such as a CD-ROM), or a magneto-optical storage medium (such as an MO).

Therefore, the present disclosure further discloses a storage medium, having a data processing program stored therein, the data processing program being used to perform any one of the embodiments of the method in the present disclosure.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A video decoding method for a mobile terminal, comprising:
   receiving a video file from a server;
   based on a hardware-decoding model whitelist and a hardware-decoding operating-system blacklist, obtained from a server, and locally obtained type information of the mobile terminal, determining whether a decoding method of the video file is hardware decoding or software decoding; and
   decoding the video file by using the determined decoding method and playing back the decoded video file,
   wherein the hardware-decoding model whitelist includes model information of mobile terminals that can perform hardware decoding on the video file, and the hardware-decoding operating-system blacklist includes model information of mobile terminals that do not support hardware decoding on the video file and version numbers of operating systems of the mobile terminals;
   wherein the type information of the mobile terminal comprises the model information of the mobile terminal and the version number of the operating system of the mobile terminal; and
   the determining whether a decoding method of the video file is hardware decoding or software decoding comprises:
     determining whether the hardware-decoding model whitelist includes the model information of the mobile terminal;
     when it is determined that the hardware-decoding model whitelist includes the model information of the mobile terminal, determining whether the hardware-decoding operating-system blacklist includes the model information of the mobile terminal and the version number of the operating system of the mobile terminal; and
     when it is determined that the hardware-decoding operating-system blacklist does not include the model information of the mobile terminal and the version number of the operating system of the mobile terminal, determining whether a hardware-decoding-crash video information list includes a URL (universal resource locator) of the video file; and
     when it is determined that the hardware-decoding-crash video information list does not include the URL of the video file, determining that the decoding method is the hardware decoding.

2. The method according to claim 1, wherein, before determining whether a decoding method of the video file is hardware decoding or software decoding, the method further comprises:
   obtaining from the server a latest version number of hardware-decoding model whitelist;
   comparing the latest version number of hardware-decoding model whitelist with a version number of a locally stored hardware-decoding model whitelist;
   when the latest version number of hardware-decoding model whitelist is different from the version number of the locally stored hardware-decoding model whitelist, obtaining a latest hardware-decoding model whitelist from the server as the hardware-decoding model whitelist;
   when the latest version number of hardware-decoding model whitelist is not different from the version number of the locally stored hardware-decoding model whitelist, using the locally stored hardware-decoding model whitelist as the hardware-decoding model whitelist;
   obtaining from the server a latest version number of hardware-decoding operating-system blacklist;
   comparing the latest version number of hardware-decoding operating-system blacklist with a version number of a locally stored hardware-decoding operating-system blacklist;
   when the latest version number of hardware-decoding operating-system blacklist is different from the version number of the locally stored hardware-decoding operating-system blacklist, obtaining a latest hardware-decoding operating-system blacklist from the server as the hardware-decoding operating-system blacklist; and
   when the latest version number of hardware-decoding operating-system blacklist is not different from the version number of the locally stored hardware-decoding operating-system blacklist, using the locally stored hardware-decoding operating-system blacklist as the hardware-decoding operating-system blacklist.

3. The method according to claim 1, wherein type information of the mobile terminal comprises the model information of the mobile terminal and the version number of the operating system of the mobile terminal; and the determining whether a decoding method of the video file is hardware decoding or software decoding comprises:
   determining whether the hardware-decoding model whitelist includes the model information of the mobile terminal;
   when it is determined that the hardware-decoding model whitelist includes the model information of the mobile terminal, determining whether the hardware-decoding operating-system blacklist includes the model information of the mobile terminal and the version number of the operating system of the mobile terminal; and
   when it is determined that the hardware-decoding operating-system blacklist does not include the model information of the mobile terminal and the version number of the operating system of the mobile terminal, determining that the decoding method is the hardware decoding.

4. The method according to claim 3, further comprising:
   when it is determined that the hardware-decoding model whitelist does not include the model information of the mobile terminal, determining that the decoding method is the software decoding.

5. The method according to claim 3, further comprising:
when it is determined that the hardware-decoding operating-system blacklist includes the model information of the mobile terminal and the version number of the operating system of the mobile terminal, determining that the decoding method is the software decoding.

6. The method according to claim 3, further comprising:
determining that the operating system of the mobile terminal crashes when the hardware decoding is performed on the video file;
sending crash-related information to the server, wherein the crash-related information includes the model information of the mobile terminal, the version number of the operating system, and application running information at a moment of crashing, such that the server updates the hardware-decoding operating-system blacklist according to the crash-related information.

7. The method according to claim 1, further comprising:
when it is determined that the hardware-decoding-crash video information list includes the URL of the video file, determining that the decoding method for decoding the video file is the software decoding.

8. A mobile terminal, comprising:
a memory storing instructions; and
a processor coupled to the memory and, when executing the instructions, configured for:
  receiving a video file from a server;
  based on a hardware-decoding model whitelist and a hardware-decoding operating-system blacklist, obtained from a server, and locally obtained type information of the mobile terminal, determining whether a decoding method of the video file is hardware decoding or software decoding; and
  decoding the video file by using the determined decoding method and playing back the decoded video file,
  wherein the hardware-decoding model whitelist includes model information of mobile terminals that can perform hardware decoding on the video file, and the hardware-decoding operating-system blacklist includes model information of mobile terminals that do not support hardware decoding on the video file and version numbers of operating systems of the mobile terminals;
  wherein the type information of the mobile terminal comprises the model information of the mobile terminal and the version number of the operating system of the mobile terminal; and
  the determining whether a decoding method of the video file is hardware decoding or software decoding comprises:
    determining whether the hardware-decoding model whitelist includes the model information of the mobile terminal;
    when it is determined that the hardware-decoding model whitelist includes the model information of the mobile terminal, determining whether the hardware-decoding operating-system blacklist includes the model information of the mobile terminal and the version number of the operating system of the mobile terminal; and
    when it is determined that the hardware-decoding operating-system blacklist does not include the model information of the mobile terminal and the version number of the operating system of the mobile terminal, determining whether a hardware-decoding-crash video information list includes a URL (universal resource locator) of the video file; and
    when it is determined that the hardware-decoding-crash video information list does not include the URL of the video file, determining that the decoding method is the hardware decoding.

9. The mobile terminal according to claim 8, wherein, before determining whether a decoding method of the video file is hardware decoding or software decoding, the processor is further configured for:
  obtaining from the server a latest version number of hardware-decoding model whitelist;
  comparing the latest version number of hardware-decoding model whitelist with a version number of a locally stored hardware-decoding model whitelist;
  when the latest version number of hardware-decoding model whitelist is different from the version number of the locally stored hardware-decoding model whitelist, obtaining a latest hardware-decoding model whitelist from the server as the hardware-decoding model whitelist;
  when the latest version number of hardware-decoding model whitelist is not different from the version number of the locally stored hardware-decoding model whitelist, using the locally stored hardware-decoding model whitelist as the hardware-decoding model whitelist;
  obtaining from the server a latest version number of hardware-decoding operating-system blacklist;
  comparing the latest version number of hardware-decoding operating-system blacklist with a version number of a locally stored hardware-decoding operating-system blacklist;
  when the latest version number of hardware-decoding operating-system blacklist is different from the version number of the locally stored hardware-decoding operating-system blacklist, obtaining a latest hardware-decoding operating-system blacklist from the server as the hardware-decoding operating-system blacklist; and
  when the latest version number of hardware-decoding operating-system blacklist is not different from the version number of the locally stored hardware-decoding operating-system blacklist, using the locally stored hardware-decoding operating-system blacklist as the hardware-decoding operating-system blacklist.

10. The mobile terminal according to claim 8, wherein type information of the mobile terminal comprises the model information of the mobile terminal and the version number of the operating system of the mobile terminal; and the determining whether a decoding method of the video file is hardware decoding or software decoding comprises:
  determining whether the hardware-decoding model whitelist includes the model information of the mobile terminal;
  when it is determined that the hardware-decoding model whitelist includes the model information of the mobile terminal, determining whether the hardware-decoding operating-system blacklist includes the model information of the mobile terminal and the version number of the operating system of the mobile terminal; and
  when it is determined that the hardware-decoding operating-system blacklist does not include the model information of the mobile terminal and the version number of the operating system of the mobile terminal, determining that the decoding method is the hardware decoding.

11. The mobile terminal according to claim 10, the processor further configured for:
  when it is determined that the hardware-decoding model whitelist does not include the model information of the mobile terminal, determining that the decoding method is the software decoding.

12. The mobile terminal according to claim 10, the processor further configured for:
  when it is determined that the hardware-decoding operating-system blacklist includes the model information of the mobile terminal and the version number of the operating system of the mobile terminal, determining that the decoding method is the software decoding.

13. The mobile terminal according to claim 10, the processor further configured for:
  determining that the operating system of the mobile terminal crashes when the hardware decoding is performed on the video file;
  sending crash-related information to the server, wherein the crash-related information includes the model information of the mobile terminal, the version number of the operating system, and application running information at a moment of crashing, such that the server updates the hardware-decoding operating-system blacklist according to the crash-related information.

14. The mobile terminal according to claim 8, the processor further configured for:
  when it is determined that the hardware-decoding-crash video information list includes the URL of the video file, determining that the decoding method for decoding the video file is the software decoding.

15. A video decoding method for a server, comprising:
  sending a video file to a mobile terminal for playback; and
  sending a hardware-decoding model whitelist and a hardware-decoding operating-system blacklist to the mobile terminal, so as to cause the mobile terminal to, based on the hardware-decoding model whitelist and the hardware-decoding operating-system blacklist, and locally obtained type information of the mobile terminal, determine whether a decoding method of the video file is hardware decoding or software decoding,
  wherein the hardware-decoding model whitelist includes model information of mobile terminals that can perform hardware decoding on the video file, and the hardware-decoding operating-system blacklist includes model information of mobile terminals that do not support hardware decoding on the video file and version numbers of operating systems of the mobile terminals;
  wherein the type information of the mobile terminal comprises the model information of the mobile terminal and the version number of the operating system of the mobile terminal; and
  the determining whether a decoding method of the video file is hardware decoding or software decoding comprises:
    determining whether the hardware-decoding model whitelist includes the model information of the mobile terminal;
    when it is determined that the hardware-decoding model whitelist includes the model information of the mobile terminal, determining whether the hardware-decoding operating-system blacklist includes the model information of the mobile terminal and the version number of the operating system of the mobile terminal; and
    when it is determined that the hardware-decoding operating-system blacklist does not include the model information of the mobile terminal and the version number of the operating system of the mobile terminal, determining whether a hardware-decoding-crash video information list includes a URL (universal resource locator) of the video file; and
    when it is determined that the hardware-decoding-crash video information list does not include the URL of the video file, determining that the decoding method is the hardware decoding.

16. The method according to claim 15, wherein, before the sending a hardware-decoding model whitelist and a hardware-decoding operating-system blacklist to the mobile terminal, the method further comprises:
  when receiving a request from the mobile terminal for obtaining a version number of the hardware-decoding model whitelist, sending a latest version number of the hardware-decoding model whitelist to the mobile terminal, so that the mobile terminal determines whether a latest hardware-decoding model whitelist is locally stored;
  when receiving a request from the mobile terminal for obtaining the latest hardware-decoding model whitelist, sending the latest hardware-decoding model whitelist to the mobile terminal;
  when receiving a request from the mobile terminal for obtaining a version number of the hardware-decoding operating-system blacklist, sending a latest version number of the hardware-decoding operating-system blacklist to the mobile terminal, so that the mobile terminal determines whether a latest hardware-decoding operating-system blacklist is locally stored; and
  when receiving a request from the mobile terminal for obtaining the latest hardware-decoding operating-system blacklist, sending the latest hardware-decoding operating-system blacklist to the mobile terminal.

17. The method according to claim 15, further comprising:
  receiving crash-related information from any mobile terminal, wherein the crash-related information includes model information, a version number of an operating system, and application running information at a moment of crashing of the operating system;
  determining a cause of the crashing of the operating system according to the application running information in the crash-related information at the moment of the crashing of the operating system;
  when cause of the crashing is hardware decoding, updating a total number of crashing corresponding to the model information and the version number of the operating system; and
  when the total number of crashing is greater than a preset threshold, adding the model information and the version number of the operating system to the hardware-decoding operating-system blacklist.

18. A non-transitory computer-readable medium containing computer-executable program for, when being executed by a processor, implementing a video decoding method for a mobile terminal, the method comprising:
  receiving a video file from a server;
  based on a hardware-decoding model whitelist and a hardware-decoding operating-system blacklist, obtained from a server, and locally obtained type information of the mobile terminal, determining whether a decoding method of the video file is hardware decoding or software decoding; and decoding the video file by using the determined decoding method and playing back the decoded video file, wherein the hardware-decoding model whitelist includes model information of mobile terminals that can perform hardware decoding on the video file, and the hardware-decoding operating-system blacklist includes model information of mobile terminals that do not support hardware decoding on the video file and version numbers of operating systems of the mobile terminals;

wherein the type information of the mobile terminal comprises the model information of the mobile terminal and the version number of the operating system of the mobile terminal; and the determining whether a decoding method of the video file is hardware decoding or software decoding comprises:

determining whether the hardware-decoding model whitelist includes the model information of the mobile terminal;

when it is determined that the hardware-decoding model whitelist includes the model information of the mobile terminal, determining whether the hardware-decoding operating-system blacklist includes the model information of the mobile terminal and the version number of the operating system of the mobile terminal; and     when it is determined that the hardware-decoding operating-system blacklist does not include the model information of the mobile terminal and the version number of the operating system of the mobile terminal, determining whether a hardware-decoding-crash video information list includes a URL (universal resource locator) of the video file; and when it is determined that the hardware-decoding-crash video information list does not include the URL of the video file, determining that the decoding method is the hardware decoding.

\* \* \* \* \*